Aug. 8, 1944.  P. C. READ  2,355,239
BOTTLE WASHING MACHINE
Filed Jan. 4, 1941  4 Sheets-Sheet 1
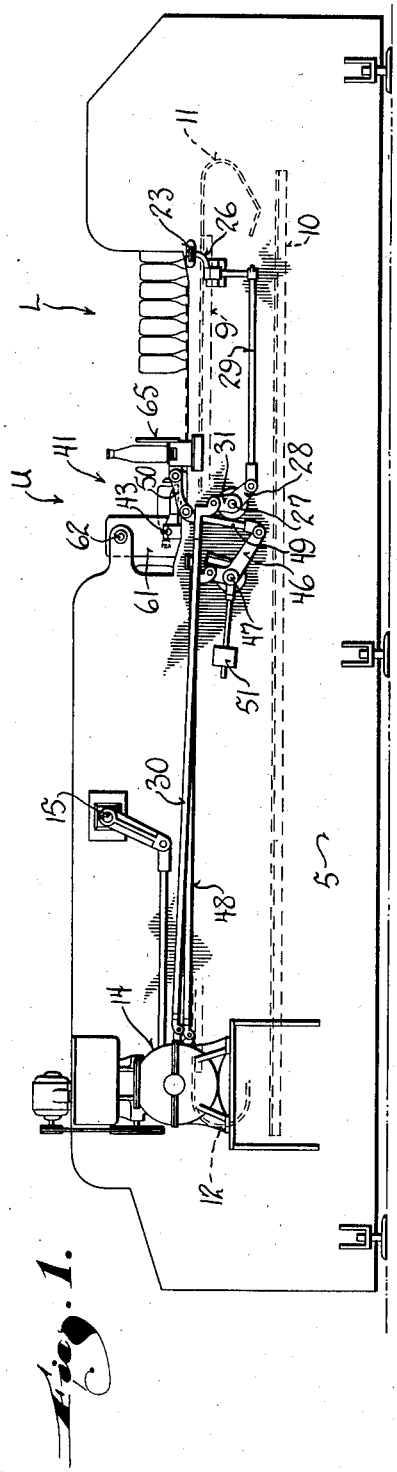
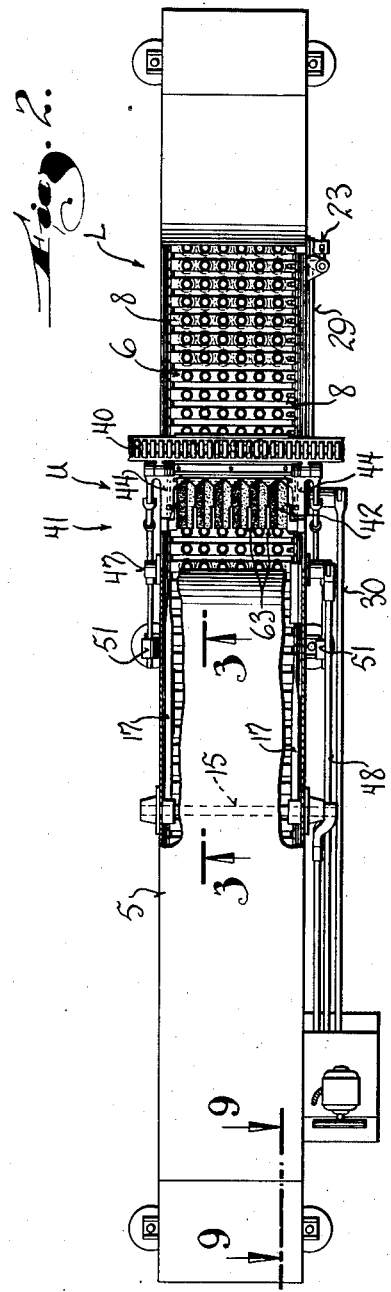
Inventor
Philip C. Read

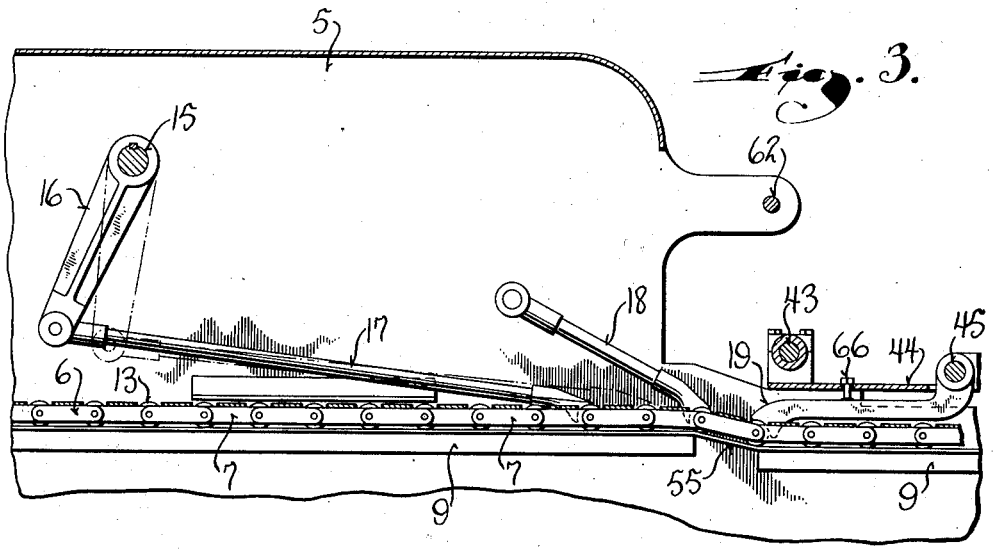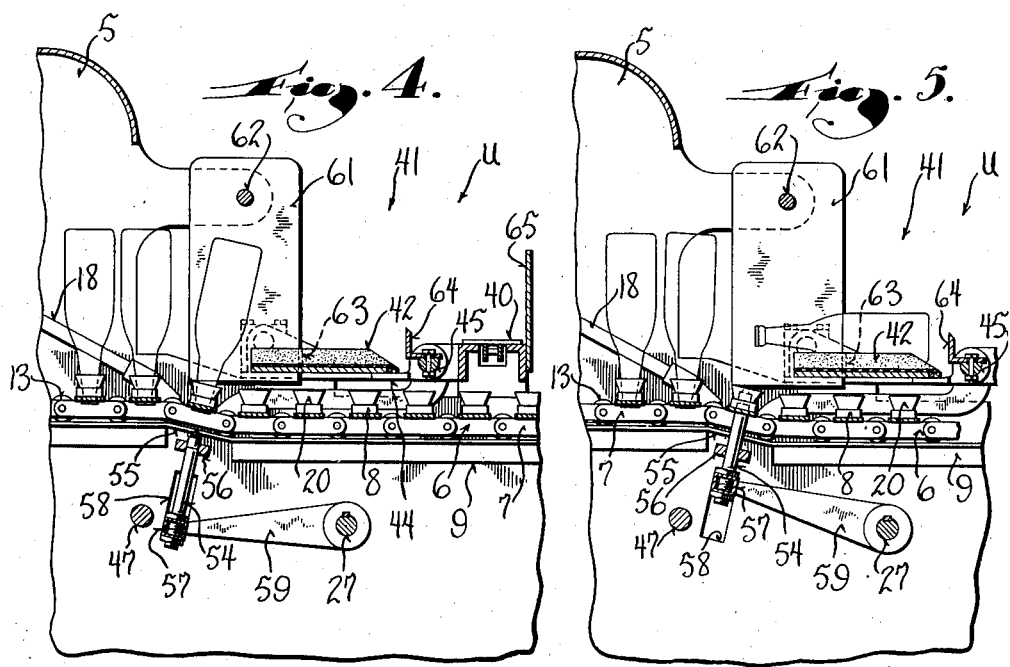

Aug. 8, 1944.    P. C. READ    2,355,239
BOTTLE WASHING MACHINE
Filed Jan. 4, 1941    4 Sheets-Sheet 3
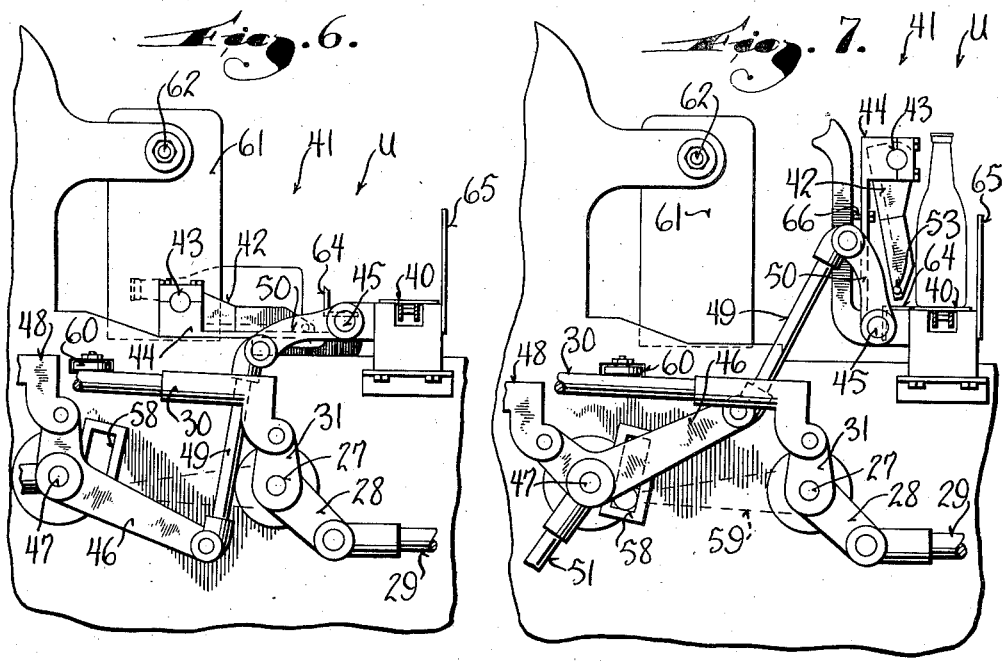
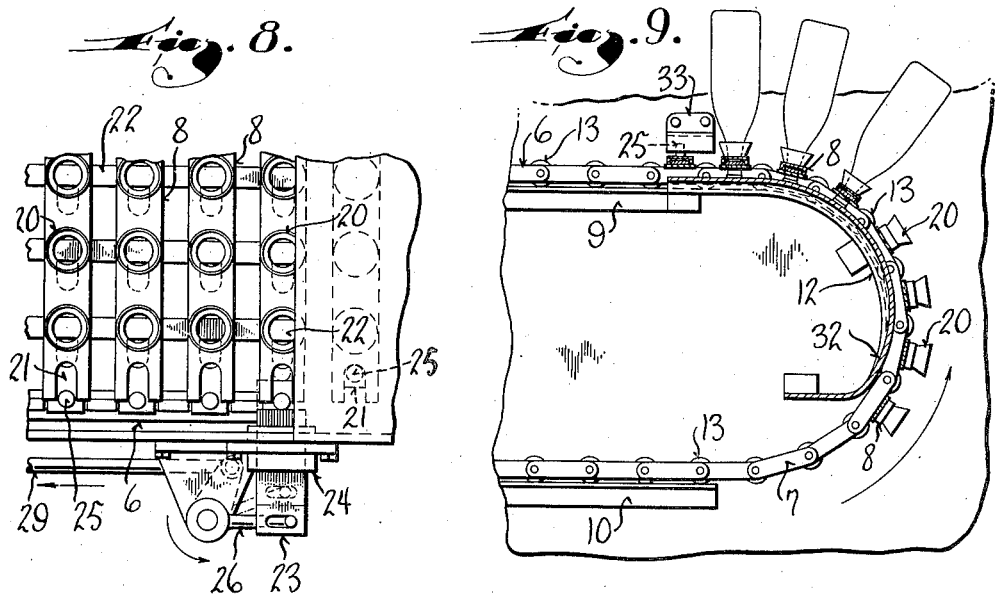
Inventor
Philip C. Read
By
Attorney Aug. 8, 1944.  P. C. READ  2,355,239
BOTTLE WASHING MACHINE
Filed Jan. 4, 1941  4 Sheets-Sheet 4
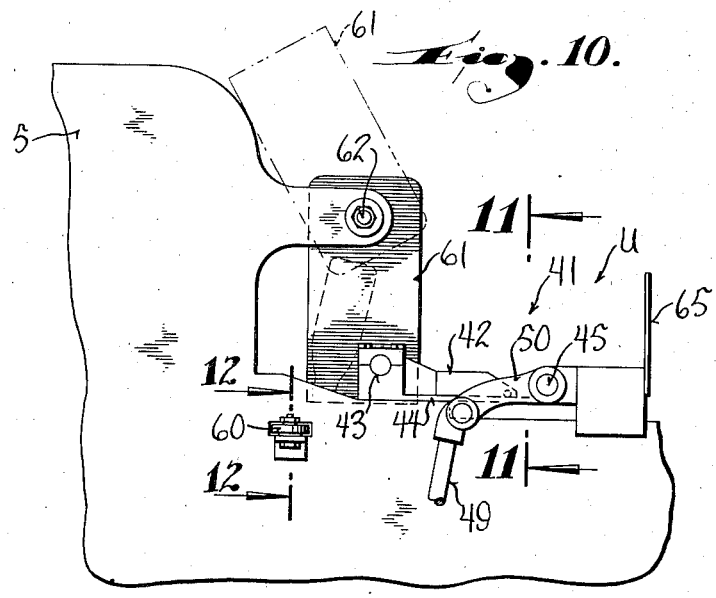
Fig. 10.
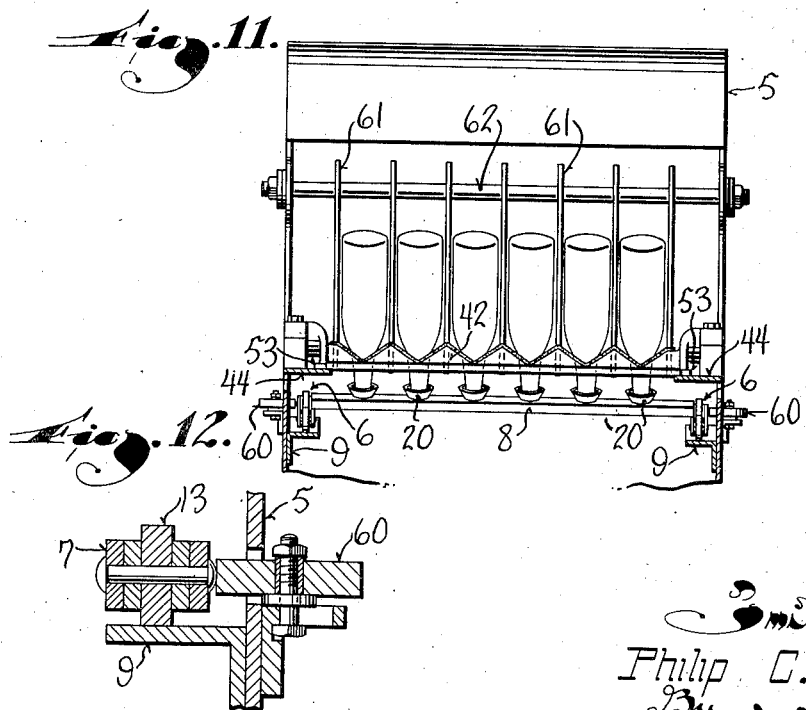
Fig. 11.
Fig. 12.
Inventor
Philip C. Read
By
Attorney Patented Aug. 8, 1944

2,355,239

UNITED STATES PATENT OFFICE 2,355,239

BOTTLE-WASHING MACHINE

Philip C. Read, Shorewood, Wis., assignor to Dostal & Lowey Co., Inc., Menomonee Falls, Wis., a corporation of Wisconsin Application January 4, 1941, Serial No. 373,062

4 Claims. (Cl. 198—24)

This invention relates to bottle washing machines and refers particularly to machines of the type wherein an endless conveyor carries bottles through the machine from a loading station to an unloading station, and wherein the bottles are gripped at their necks to be inverted as they travel along with the upper stretch of the conveyor.

This invention contemplates a general improvement in bottle washing machines of this type, and especially in the means employed for transferring the bottles from the conveyor to the washed-bottle-delivery mechanism.

To this end it is an object of the present invention to provide novel means for causing the bottles to tilt toward the transfer mechanism as they are presented thereto, so that upon ejection from the sockets of the conveyor in which the bottles ride as they approach the unloading station, they fall by gravity onto the carrier or table of the transfer mechanism.

Also with a view toward insuring proper placement of the bottles on the carrier of the transfer mechanism, it is a further object of this invention to provide guides to support the bottles against falling sidewise as they tip from their inverted positions on the conveyor into horizontal positions on the transfer carrier.

Another object of this invention, directed toward smoother functioning of the transfer mechanism, resides in the provision of a bottle support on the carrier of the transfer mechanism so located as to assume a position substantially flush with the conveyor of the delivery mechanism to thus assure smoother transfer of the bottles from the carrier onto the delivery conveyor.

In the transfer mechanism of bottle washing machines of this type heretofore in use, the means employed to push the bottles onto the delivery conveyor has always entailed a more or less complicated structure.

It is, therefore, another object of this invention to provide a new and novel manner of mounting the carrier of the transfer mechanism so that its inherent weight causes it to swing in a manner to push the bottles onto the delivery conveyor.

Proper transfer of the bottles from the conveyor to the transfer mechanism entails accurate positioning of the bottles with relation to the ejecting mechanism which lifts the bottles out of the conveyor sockets. To this end it is a further object of this invention to provide effective means for firmly holding that portion of the conveyor directly adjacent to the ejector mechanism against any movement whatsoever during the functioning of the ejector mechanism.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side view of a bottle washing machine embodying this invention;

Figure 2 is a top view thereof with parts broken away and in section;

Figure 3 is an enlarged longitudinal sectional view through the upper portion of the machine adjacent to its unloading station and illustrating particularly the manner in which the conveyor chain is advanced and locked against longitudinal motion during the transfer intervals, said view being taken substantially on the plane of the line 3—3 in Figure 2;

Figure 4 is a similar longitudinal sectional view through a portion of the machine adjacent to the unloading station, but taken on a plane in advance of that of Figure 3, and showing particularly the manner in which the conveyor flights are tilted while the bottles are ejected;

Figure 5 is a view similar to Figure 4 but showing the parts in the positions they occupy directly after ejection of the bottles;

Figure 6 is a fragmentary side view of that portion of the machine shown in Figures 4 and 5 to illustrate the mechanism for actuating the transfer carrier, said view showing the parts in the positions they occupy when the transfer carrier is down in its bottle receiving position;

Figure 7 is a view similar to Figure 6 but showing the parts in the positions they occupy when the carrier is swung up;

Figure 8 is a fragmentary top view of that portion of the machine at which the latch bars are slid to their locking positions, said view illustrating the manner in which the latch bars are actuated;

Figure 9 is a fragmentary sectional view through the machine at its end at which the bottle conveyor travels upwardly from its lower to its upper stretch and illustrating the manner in which the bottles are supported during the unlocking of the latches;

Figure 10 is a fragmentary side view similar to Figures 6 and 7, but showing particularly the manner in which the guides for holding the bottles against sidewise tipping are mounted to permit the same to be swung to inoperative position when not required;

Figure 11 is a detail cross sectional view taken through Figure 10 on the plane of the line 11—11; and Figure 12 is a detail sectional view taken through Figure 10 on the plane of the line 12—12.

Referring now particularly to the accompanying drawings, in which like numerals indicate like parts throughout the several views, the numeral 5 designates the casing or tank of the bottle washing machine. In it is the bath in which the bottles are immersed and the spray nozzles and other apparatus (not shown) by which the washing is effected as the bottles are carried through the machine from a loading station L to an unloading station U by means of a conveyor designated generally by the numeral 6.

The conveyor 6 consists of two spaced parallel sprocket chains 7 connected by transverse bottle carrying flights 8. The conveyor is supported and guided for intermittent movement through the machine on sets of upper and lower tracks 9 and 10, respectively. These tracks are preferably angle irons secured to the side walls of the casing or tank, the lower tracks being straight from end to end, while the upper tracks have curved end portions 11 and 12.

As best shown in Figure 12 the conveyor chains are supported on the horizontal flanges of the tracks and to reduce friction are equipped with rollers 13 which run on the tracks. Attention is directed to the fact that the loading and unloading stations are positioned medially of the ends of the conveyor stretches but nearer the ends 11 of the upper tracks so that the major portion of the upper stretch or run of the conveyor is available to carry inverted bottles past operating nozzles and other cleaning apparatus (not shown).

The conveyor is intermittently advanced by a ratchet-like mechanism actuated from a drive unit 14 and including a rock shaft 15 extending transversely across the tank.

The shaft 15 is oscillated from the drive mechanism and has lever arms 16 secured thereto adjacent to the opposite side walls of the tank.

Pusher bars 17 attached to the lower free ends of the lever arms 16 and provided with forked end portions to engage the rollers of the conveyor chains intermittently advance the conveyor as the shaft 15 is oscillated.

Retrograde movement of the conveyor is precluded by ratchet arms 18 pivotally supported from the sides of the tank and provided with forked ends to engage the rollers of the chain as do the pusher arms 17.

Forward motion of the conveyor is also prevented during its periods of rest, for a purpose to be later described, by pivoted stops 19 which drop down into engagement with the rollers of the conveyor chains somewhat in the manner of the forked ends of the ratchet arms 18.

The individual flights of the conveyor are substantially tubular structures having their ends fixed to the conveyor chains and provided along their length with sockets 20 of a size to receive the neck portions of the bottles to be carried.

Slidable longitudinally within each of the tubular flights is a latch bar 21. Key-hole shaped openings in the latch bar permit the passage of the headed bottle ends through the sockets 20 when the latch bar is in an open or unlocked position and secure the bottles to the flights upon sliding the latch bar closed to a locking position. While the clearance necessary to accommodate variations in bottle-neck sizes, results in leaving the bottles free for a limited degree of endwise motion in their sockets. The bottles become locked to the conveyor to the extent that they hang by their necks as they travel along the lower stretch.

To enable sliding the latch bars to their closed or locked position, it is, of course, essential that the bottles be held at a proper elevation with relation to the flights. For this purpose longitudinal bars or tracks 22 are arranged under the conveyor at the loading station with the bars or tracks aligned with the sockets as clearly shown in Figure 8.

Hence, as the bottles are inserted into the sockets in inverted position with their open ends resting on the bars or tracks 22, they are supported in proper positional relationship to the latch bars as the flights approach the point at which the latch bars are slid to their closed bottle securing positions.

Heretofore, closure of the latch bars has been accomplished by a stationary cam positioned to engage cam followers on the latch bars, but this manner of closing the latch bars imposes a side thrust resulting in lateral strain on the bars and often resulting in breakage of the bottles. To overcome this objection a reciprocable plunger 23 is mounted in a guideway 24 in the side wall of the casing or tank at a point to align axially with the latch bars as the flights are successively presented thereto.

The inner end of the plunger is engageable with pins 25 on the latch bars to slide the bars to their closed positions with a force applied in direct longitudinal alignment with the latch bars.

The reciprocation of the plunger 23 is coordinated with the intermittent advance of the conveyor to operate in timed relation therewith and is effected by means of a bell-crank lever 26 suitably mounted from the side of the casing or tank and driven from a rock shaft 27 which extends transversely across the machine adjacent to the unloading station. A crank arm 28 and a link 29 connect the rock shaft 27 with the bell crank lever.

The rock shaft 27 is oscillated from the drive unit 14 in proper timed relation to the intermittent advance of the conveyor and is connected with the drive unit by a link 30 and a crank arm 31.

As stated, the bottles hang from their necks during their travel along the lower stretch or run of their passage through the machine and during this time they are submersed in the contents of the tank to receive a thorough soaking.

At the end of the lower stretch of the conveyor where the bottles are carried upwardly around the turn defined by the curved ends 12 of the upper track, the open ends of the bottles ride onto a curved plate 32 which supports them against dropping down into the sockets as they reach the upper stretch. The bottles are thus held in positions at which the latch bars may be freely slid to their open or unlocked positions. This is effected by a stationary cam 33 which engages the pins 25.

It is to be observed that the cam 33 is located directly adjacent to the end of the plate 32 and that the plate 32 extends only a slight distance beyond the actual turn of the conveyor path. Hence, the bottles are free to drop down into the conveyor flight sockets directly after the latch bars are opened so that for the remainder of their travel toward the unloading station they are firmly held and centered by the sockets.

This insures proper alignment between the bottles and the spray nozzles and other devices (not shown) for completing the cleaning operation and particularly the internal cleansing and sterilizing.

At the unloading station is a bottle delivery mechanism comprising essentially a conveyor 40 extending transversely across the machine to carry off the washed bottles which are transferred thereto from the conveyor of the machine by a transfer mechanism indicated generally by the numeral 41.

The transfer mechanism 41 consists of a carrier or table 42 provided with a plurality of troughs to receive the bottles, the surfaces of which are preferably covered with rubber or other similar material. The number of bottle troughs on the carrier or table corresponds to the number of rows of bottles extending across the width of the machine.

The carrier or table is pivotally supported as at 43 by two spaced parallel arms 44 fixed to a cross shaft 45. The shaft 45 is adapted to be rocked to swing the arms 44 from a horizontal position to an upright substantially vertical position.

Oscillation is imparted to the shaft 45 by bell crank levers 46 fixed to a cross shaft 47 extending across the machine and oscillated from the drive unit by means of a suitable connecting rod 48. Links 49 connect the bell crank-levers 46 with arms 50 secured to the cross shaft 45.

To reduce the load imposed on the drive unit by its actuation of the bottle transfer mechanism counter-balancing weights 51 are connected to the cross shaft 47.

In the lowered substantially horizontal position of the arms 44, the transfer carrier or table 42 is likewise in a horizontal position to receive bottles ejected from the conveyor 6. In this position the carrier or table is supported by its pivotal connections 43 with the arms 44 and by lugs 53 projecting from the sides of the carrier or table and resting on the arms 44.

The lugs 53 may be the ends of a rod extending transversely across the carrier to increase the weight of its lower end for a purpose to be hereinafter described.

While the transfer carrier or table is in its lowered bottle receiving position as shown in Figures 4, 5 and 6, the bottles carried by the flight directly in front of the carrier or table are ejected by plungers 54. These plungers reciprocate beneath the upper stretch of the conveyor and poke through the open sockets to lift and eject the bottles therefrom. To insure the bottles falling onto the transfer carrier or table, the track 9 dips down as at 55 and continues horizontally at a lower level.

The location of the dip 55 and its length is such that only the flight directly in front of the transfer carrier or table and over the ejectors is in position thereon, and by virtue of the angle of its inclination the bottles carried by that flight lean toward the transfer carrier or table. Hence, when the bottles are ejected from the sockets they fall onto the waiting carrier or table.

It is to be observed that the path of the flights is horizontal until the dip 55 in the track is reached and then it is only the single flight over the ejector plungers which is inclined. Consequently, the tilting of the successive flights does not cause the bottles on adjacent flights to collide, as the flights traveling along the track leading from the bottom of the incline or dip carry no bottles.

To further insure having the bottles dropped onto the carrier or table, the ejector plungers 54 reciprocate on inclined axes substantially normal to the plane of the tilted conveyor flight.

The plungers are guided for axial reciprocation by a cross bar 56 directly under the dip in the track and by having their lower ends fixed to a carrier bar 57. The ends of this bar 57 are received in guideways 58 which constrain its motion to a translating movement parallel to the inclined axes of the plungers. Such motion is imparted to the bar 57 and, consequently, the plungers by crank arms 59 fixed to the shaft 27 and having their free ends suitably connected to the cross bar 57.

It is important to note that it is the flight on the dip 55 in the track which is held against forward or backward movement by the stops 18 and 19. Hence, proper positional relationship between the mouths of the bottles carried by the tilted flight and the ejecting plungers is assured in a direction longitudinal to the conveyor.

Transversely or laterally the tilted conveyor flight is held in proper position with relation to the ejector plungers by guide rollers 60 mounted from the side walls of the tank or casing in position to engage the sides of the conveyor chains and securely hold the adjacent flight against shifting one way or the other.

The conveyor flight in position over the ejector plungers is thus, firmly and positively held in proper positional relationship to the plungers.

As the bottles are ejected from the conveyor sockets, they might tip sidewise except for the provision of guides 61. These guides are in the nature of partition walls supported from a cross bar 62 in proper spaced relationship. Their lower ends enter slits 63 in the outer portion of the transfer carrier or table when the same is in its lowered position. The guides thus extend a substantial distance onto the carrier or table so that even small bottles are guided to their proper troughs.

When large or excessively wide bottles are being handled, the guides 61 may be swung to an inoperative position as shown in dotted lines in Figure 10.

The bottles deposited onto the transfer carrier or table in this manner slide down onto a shelf 64 fixed to the shaft 45 as the carrier or table is swung upwardly to its position shown in Figure 7. In this manner the bottles are prevented from striking the adjacent edge of the support for the conveyor 40, and instead are carried on the shelf or platform 64 which assumes a position substantially flush with the conveyor 40 as the transfer action takes place. To insure the shelf 64 being flush with the conveyor 40 its attachment to the shaft 45 is adjustable.

As the transfer carrier or table is swung upwardly from its horizontal position to its raised position shown in Figure 7, the bottles thereon are pushed off the shelf 64 onto the conveyor 40 against a back stop 65 solely by the effect of gravity on the transfer carrier or table per se. This follows from the fact that the pivotal support 43 for the carrier or table is to one side of a vertical plane passing through the center of gravity of the table (when raised). This manner of mounting the transfer carrier or table, thus, obviates the necessity for mechanical mechanism heretofore employed to swing the carrier outwardly for the purpose of pushing the bottles into the delivery conveyor.

It is also to be observed that the stops 19 which serve to hold the conveyor against forward motion during the transfer cycle are connected with the arms 44 by connections 66 so that as the transfer mechanism functions to deposit the bottles on the delivery conveyor, the stops 19 are disengaged from the conveyor chains. The connections 66 between the stops and arms 44 have a degree of lost motion to permit the stops to settle down onto the conveyor chains without hindrance from the arms 44 and also to permit the arms 44 to move through their full range of motion without interference from the stops.

From the foregoing description taken in connection with the accompanying drawings, it will be readily apparent to one skilled in the art that this invention provides a substantial improvement in bottle washing machines of the type described and that these improvements insure smoother and more efficient operation of the machine.

What I claim as my invention is:

1. In a bottle washing machine the combination of: a conveyor track; an endless conveyor intermittently movable along said track for carrying bottles through the machine, said conveyor having transverse bottle carrying flights provided with sockets in which the bottles are supported in substantially vertical inverted position as the conveyor travels along the track; ejecting plungers operable beneath the conveyor for ejecting bottles upwardly from the sockets; mechanism for receiving the bottles ejected from the sockets of the conveyor; and a dip in the track adjacent to the ejecting plungers and inclined downwardly toward said mechanism for effecting tilting of the flights passing thereover so that bottles supported by said flights are tilted directly from their substantially vertical positions to positions leaning toward said mechanism, the length of said dip being substantially equal to the pitch length of one flight of the conveyor and the track portions directly adjacent to the dip being horizontal with one portion on a higher level than the other.

2. In a bottle washing machine the combination of: an endless conveyor for carrying bottles through the machine, said conveyor having transverse bottle carrying flights provided with sockets for receiving the necks of the bottles; track means on which the conveyor runs with a substantially horizontal upper stretch, the bottles being so carried by the conveyor as to be substantially vertical and inverted while they travel along said upper stretch; means beneath the upper stretch of the conveyor and operable to eject bottles upwardly from the conveyor; a carrier for receiving bottles ejected from the conveyor; means for causing bottles about to be ejected to tilt directly from their upright non-tilted position to a position leaning toward said carrier; and side guides for holding the bottles against tipping sidewise and to guide the same onto the carrier.

3. In a bottle washing machine including an intermittently movable conveyor having spaced flights each of which is provided with sockets to receive the necks of bottles: a substantially horizontal track along which the conveyor runs, said track having endwise spaced portions at different levels connected by an inclined portion down which the conveyor travels to carry its flights from the upper to the lower track portions, said inclined track portion being of such length that only one flight thereof is located on the inclined portion each time the conveyor comes to rest so that bottles carried by such flight are tilted directly out of normal upright positions to positions leaning toward the bottom of the incline; ejecting plungers for ejecting bottles from the flights as they come to rest on the inclined track portion, said plungers being reciprocal on inclined axes substantially normal to the plane of inclination of the inclined track portion so that the ejected bottles always fall in the direction toward which they lean; and bottle receiving means positioned to receive the ejected bottles.

4. In a bottle washing machine having an unloading station at which washed bottles are removed from the machine for delivery to filling mechanism or the like: an endless conveyor including equi-spaced transversely extending bottle carrying means; abutments at the ends of the bottle carrying means; bottle ejecting mechanism positioned at a fixed location with respect to the conveyor; means for intermittently advancing the conveyor to successively bring its bottle carrying means to said ejecting mechanism for presentation of the bottles carried thereby to said ejecting mechanism; transfer mechanism movable to and from a predetermined position cooperating with said ejecting mechanism to receive bottles ejected thereby, said transfer mechanism operating in alternate coordination with said conveyor advancing means; stop means carried by the transfer mechanism for movement therewith to and from an operative position cooperating with the abutments on said bottle carrying means to hold the conveyor against forward motion during its rest periods; and a ratchet arm mounted to permit advance of the conveyor but cooperating with said abutments on the bottle carrying means to hold the conveyor against retrograde movement during its periods of rest, said ratchet arm cooperating with the stop means to hold each of the bottle carrying means brought to the ejecting mechanism in a position at which the bottles carried thereby positively align with the ejecting mechanism.

PHILIP C. READ.